US009077052B2

(12) United States Patent
Reddy

(10) Patent No.: US 9,077,052 B2
(45) Date of Patent: Jul. 7, 2015

(54) METHODS AND SYSTEMS FOR CHARGING AN ENERGY STORAGE DEVICE

(75) Inventor: Raghothama Reddy, Murphy, TX (US)

(73) Assignee: General Electric Company, Schenectady, NY (US)

( * ) Notice: Subject to any disclaimer, the term of this patent is extended or adjusted under 35 U.S.C. 154(b) by 407 days.

(21) Appl. No.: 13/604,889

(22) Filed: Sep. 6, 2012

(65) Prior Publication Data

US 2014/0062396 A1 Mar. 6, 2014

(51) Int. Cl.
| | |
|---|---|
| *H02J 7/00* | (2006.01) |
| *H01M 10/44* | (2006.01) |
| *H02J 7/02* | (2006.01) |
| *H02J 7/04* | (2006.01) |
| *B60L 3/00* | (2006.01) |
| *B60L 3/04* | (2006.01) |
| *B60L 11/18* | (2006.01) |

(52) U.S. Cl.
CPC ............. *H01M 10/44* (2013.01); *H02J 7/0047* (2013.01); *H02J 7/022* (2013.01); *H02J 7/045* (2013.01); *H02J 2007/0001* (2013.01); *H02J 2007/0096* (2013.01); *B60L 3/0069* (2013.01); *B60L 3/04* (2013.01); *B60L 11/1812* (2013.01); *B60L 2210/30* (2013.01); *Y02T 10/7005* (2013.01); *Y02T 10/7241* (2013.01); *Y02T 90/14* (2013.01); *Y02T 90/127* (2013.01)

(58) Field of Classification Search
USPC ......... 320/14, 15, 16, 17, 116, 119, 103, 104, 320/107, 122, 125, 128, 132, 152, 162
See application file for complete search history.

(56) References Cited

U.S. PATENT DOCUMENTS

| | | | | |
|---|---|---|---|---|
| 5,633,577 | A | * | 5/1997 | Matsumae et al. ............... 322/37 |
| 5,723,970 | A | * | 3/1998 | Bell ............................... 320/140 |
| 5,825,155 | A | * | 10/1998 | Ito et al. ......................... 320/118 |
| 5,940,280 | A | | 8/1999 | Murai et al. |
| 6,040,683 | A | | 3/2000 | Mottier |
| 6,157,168 | A | * | 12/2000 | Malik ............................ 320/128 |
| 6,459,237 | B1 | * | 10/2002 | Bausch .......................... 320/125 |
| 6,686,719 | B2 | | 2/2004 | Cochoy et al. |
| 7,889,524 | B2 | * | 2/2011 | Lee et al. ......................... 363/65 |
| 8,018,204 | B2 | | 9/2011 | Bourikov et al. |
| 2001/0011880 | A1 | * | 8/2001 | James ............................ 320/104 |
| 2006/0267552 | A1 | * | 11/2006 | Baer et al. ...................... 320/128 |
| 2009/0278505 | A1 | * | 11/2009 | Toya et al. ..................... 320/152 |
| 2010/0060232 | A1 | | 3/2010 | Boyles et al. |
| 2010/0213897 | A1 | * | 8/2010 | Tse ................................ 320/116 |

(Continued)

OTHER PUBLICATIONS

Wang, D., Synchronous Rectifier MOSFET Driver Substantially Reduces Power Adapter Heat, Applied Power Electronics Conference and Exposition, 2005; Mar. 6-10, 2005; vol. No. 2, pp. 700-705.

*Primary Examiner* — Brian Ngo

(74) *Attorney, Agent, or Firm* — General Electric Company

(57) ABSTRACT

A system for use in supplying power to a power storage device. The system includes a charging device that has a plurality of power converters, each of the power converters having an output terminal configured to output current at a predetermined voltage. The system includes a power conduit configured to couple each of the terminals in series to deliver current from the plurality of power converters to the power storage device. The system includes a controller programmed to receive a power storage device voltage signal, determine a charging voltage level based on the power storage device voltage signal, and enable at least one of the plurality of power converters to supply current at the charging voltage level to the power storage device.

20 Claims, 5 Drawing Sheets

(56) References Cited

U.S. PATENT DOCUMENTS

2011/0006748 A1\* 1/2011 Jang et al. .................. 323/299
2011/0204845 A1 8/2011 Paparo et al.
2011/0285345 A1\* 11/2011 Kawai et al. .................. 320/107
2012/0043923 A1\* 2/2012 Ikriannikov et al. .......... 320/103

\* cited by examiner

METHODS AND SYSTEMS FOR CHARGING AN ENERGY STORAGE DEVICE

BACKGROUND

The embodiments described herein relate generally to electric vehicles and, more specifically, to methods and systems for charging a vehicle that includes an electrochemical energy storage device.

In response to both increasing fuel costs related to the use of conventional combustion engine vehicles and heightened environmental concerns, including air pollution, the use of electric and hybrid vehicles has increased. As a result, energy demand will likely increase in the form of electrical energy used to charge batteries or other energy storage devices used in such vehicles. Electric vehicles may include, but are not limited to, vehicles that rely solely on energy stored in batteries to drive an electric motor that propels the vehicle (e.g., a traction motor), vehicles that include batteries for storing energy used to drive a traction motor and also include an internal combustion engine that drives a generator used to recharge the batteries, and vehicles that include a combination of electric and fossil fuel powered components (e.g., hybrid vehicles).

Currently, charging devices, also referred to as charging stations or electric vehicle supply equipment (EVSE), provide power to an electric vehicle for charging of the energy storage devices within the electric vehicle. These charging stations are controlled by charging protocols which limit the amount of current supplied to the electric vehicle. Protocols which permit higher current throughput accordingly enable reduced charging times. In order to accommodate the variety of charging protocols available for electric vehicles, EVSE must also be capable of supplying a wide range of voltages. Accordingly, a conventional EVSE containing a single power module adapted for a wide range of voltages is inefficient as the design of the power module can only be optimized for a particular voltage, not for a range of voltages.

BRIEF DESCRIPTION

In one aspect, a system for use in supplying power to a power storage device is provided. The system includes a charging device that has a plurality of power converters. Each of the power converters has an output terminal configured to output current at a predetermined voltage. The system also includes a power conduit configured to couple each of the terminals in series to deliver current from the plurality of power converters to the power storage device. The system further includes a controller programmed to receive a power storage device voltage signal, determine a charging voltage level based on the power storage device voltage signal, and enable at least one of the plurality of power converters to supply current at the charging voltage level to the power storage device.

In another aspect, a method of supplying current at a specific voltage to a power storage device is provided. The method includes determining a charging voltage level required by the power storage device configured to be charged by a charging device including a plurality of power converters. The method also includes enabling at least one of the plurality of power converters to supply power at the charging voltage level to the power storage device.

DETAILED DESCRIPTION

As used herein, the term "electric vehicle" refers generally to a vehicle that includes one or more electric motors. Energy used by electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. Moreover, a hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
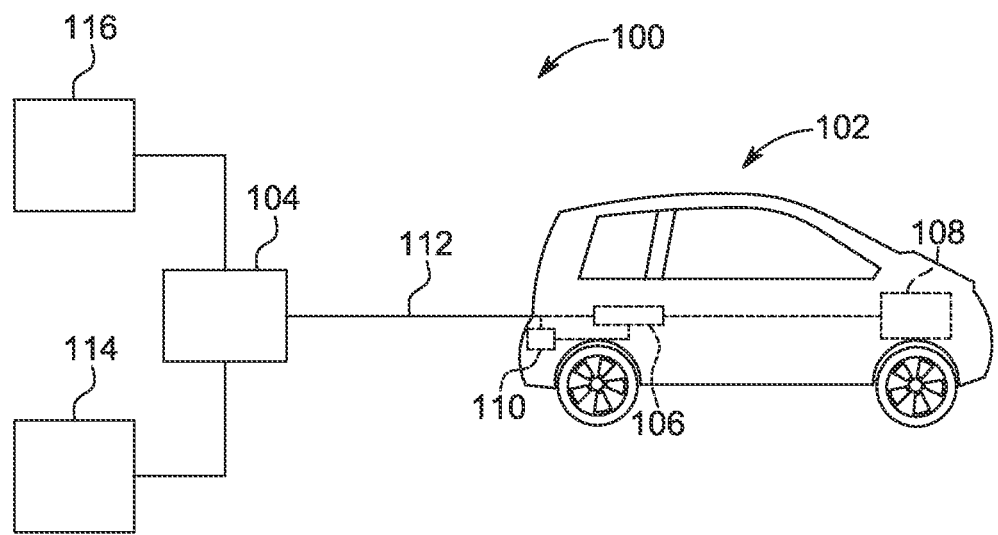
FIG. 1 is a schematic block diagram of an exemplary system for charging a power storage device.

FIG. 1 illustrates an exemplary system 100 for use in charging, or providing electricity to, an electric vehicle 102. In an exemplary embodiment, system 100 includes a charging device 104 coupled to electric vehicle 102. Electric vehicle 102 includes at least one power storage device 106, such as a battery and/or any other storage device, coupled to a motor 108. Moreover, electric vehicle 102 includes a vehicle controller 110 coupled to power storage device 106.

In an exemplary embodiment, charging device 104 is removably coupled to power storage device 106 and to vehicle controller 110 by at least one power conduit 112. Alternatively, charging device 104 may be coupled to power storage device 106 and/or vehicle controller 110 by any other conduit or conduits, and/or charging device 104 may be coupled to vehicle controller 110 by a wireless data link (not shown). In the exemplary embodiment, power conduit 112 includes at least one conductor (not shown) for supplying electricity to power storage device 106 and/or to any other component within electric vehicle 102, and at least one conductor (not shown) for transmitting data to, and receiving data from, vehicle controller 110 and/or any other component within electric vehicle 102. In an alternative embodiment, power conduit 112 includes a single conductor that transmits and/or receives power and/or data, or any other number of conductors that enables system 100 to function as described herein. Moreover, in the exemplary embodiment, charging device 104 is coupled to an electric power source 114, such as a power grid of an electric utility company, a generator, a battery, and/or any other device or system that provides electricity to charging device 104.

Charging device 104 is coupled to at least one server 116 through a network, such as the Internet, a local area network (LAN), a wide area network (WAN), and/or any other network or data connection that enables charging device 104 to function as described herein. Server 116, in the exemplary embodiment, communicates with charging device 104, for example, by transmitting a signal to charging device 104 to authorize payment and/or delivery of electricity to power storage device 106, to access customer information, and/or to perform any other function that enables system 100 to function as described herein.

Server 116 and vehicle controller 110 each include at least one processor and at least one memory device. The processors each include any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory devices each include a computer readable storage medium, such as, without limitation, random access memory (RAM), flash memory, a hard disk drive, a solid state drive, a diskette, a flash drive, a compact disc, a digital video disc, and/or any suitable memory device that enables the processors to store, retrieve, and/or execute instructions and/or data.

During operation, a user couples power storage device 106 to charging device 104 with power conduit 112. The user may access a user interface (not shown in FIG. 1) of charging device 104 to enter information, such as payment information, and/or to initiate power delivery to power storage device 106. Charging device 104 is configured to communicate with server 116, for example, to authenticate the user, to process the payment information, and/or to approve or authorize the power delivery. If charging device 104 receives a signal from server 116 that indicates approval or authorization to deliver power to power storage device 106, charging device 104 receives power from electric power source 114 and provides the power to power storage device 106 through power conduit 112.

Charging device 104 communicates with vehicle controller 110 wirelessly, through power conduit 112, and/or through any other conduit, to control and/or to monitor the delivery of power to power storage device 106. For example, vehicle controller 110 may transmit signals to charging device 104 indicating a charge level of power storage device 106 and/or a desired amount (e.g., a level of charging voltage 322) and/or rate of power to be provided by charging device 104. Moreover, charging device 104 may transmit signals to vehicle controller 110 indicating an amount and/or rate of electricity being delivered to power storage device 106. Additionally or alternatively, charging device 104 and/or vehicle controller 110 may transmit and/or receive any other signals or messages that enable system 100 to function as described herein. When power storage device 106 has been charged to a desired level, charging device 104 ceases delivering power to power storage device 106 and the user disengages power conduit 112 from power storage device 106.

Figure 2:
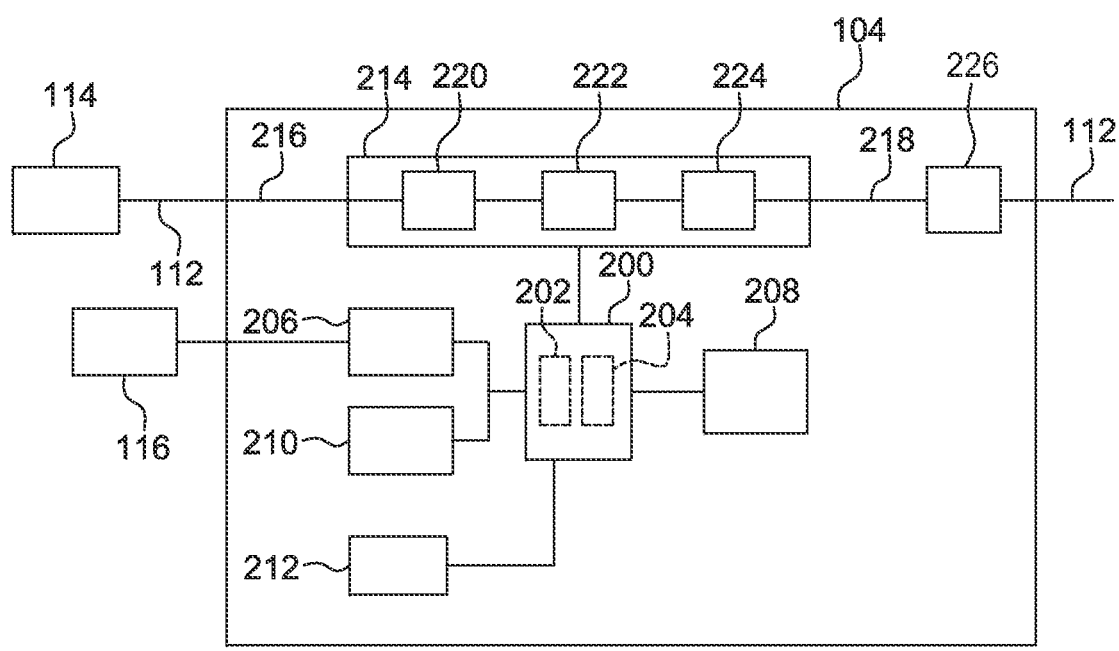
FIG. 2 is a schematic block diagram of an exemplary charging device that may be used with the system shown in FIG. 1.

FIG. 2 is a block diagram of charging device 104. In the exemplary embodiment, charging device 104 includes a controller 200 that includes a processor 202 and a memory device 204. As described more fully herein, controller 200 is coupled to a network interface 206, a display 208, a user interface 210, a vehicle communication module 212, a current control module 214, and a converter 226.

Processor 202 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 204 includes a computer readable storage medium, such as, without limitation, random access memory (RAM), flash memory, a hard disk drive, a solid state drive, a diskette, a flash drive, a compact disc, a digital video disc, and/or any suitable device that enables processor 202 to store, retrieve, and/or execute instructions and/or data.

Network interface 206, in an exemplary embodiment, transmits and receives data between controller 200 and a remote device or system, such as server 116 (shown in FIG. 1). Network interface 206 communicates with server 116 and controller 200 using any suitable communication protocol, such as a wired and/or a wireless Ethernet protocol.

Display 208, in the exemplary embodiment, includes a vacuum fluorescent display (VFD) and/or one or more light-emitting diodes (LED). Additionally or alternatively, display 208 may include, without limitation, a liquid crystal display (LCD), a cathode ray tube (CRT), a plasma display, and/or any suitable visual output device capable of displaying graphical data and/or text to a user. In the exemplary embodiment, a charging status of power storage device 106 (shown in FIG. 1), payment information, user authentication information, power consumption information of charging device 104 and/or of electric vehicle 102, fault information of charging device 104 and/or of vehicle 102, and/or any other information may be displayed to a user on display 208.

User interface 210 may include, without limitation, a keyboard, a keypad, a touch-sensitive screen, a push button, a scroll wheel, a pointing device, a barcode reader, a magnetic card reader, a radio frequency identification (RFID) card reader, an audio input device employing speech-recognition software, and/or any suitable device that enables a user to input data into charging device 104 and/or to retrieve data from charging device 104. In an exemplary embodiment, the user may input user authentication information and/or payment information using user interface 210. Moreover, the user may operate user interface 210 to initiate and/or terminate the delivery of power to power storage device 106.

In an exemplary embodiment, vehicle communication module 212 is coupled to vehicle controller 110 (shown in FIG. 1) by power conduit 112 or by any other conduit that enables vehicle communication module 212 to function as described herein. Vehicle communication module 212 transmits data to, and receives data from, vehicle controller 110 using a suitable protocol, such as power line communication (PLC), a serial communication protocol, analog voltage level detection, duty cycle measurement, and/or any other protocol that enables vehicle communication module 212 to function as described herein. In an exemplary embodiment, vehicle communication module 212 communicates with vehicle controller 110 to control and/or adjust an amount of current that power storage device 106 draws from charging device 104.

Current control module 214 is coupled to power conduit 112 which has an input end 216 and an output end 218. Input end 216 is coupled to a power source, such as electric power source 114 (shown in FIG. 1), and output end 218 is coupled to a load, such as power storage device 106. More specifically, in an exemplary embodiment, input end 216 is coupled to a single phase of a three phase alternating current (AC) power source, such as electric power source 114. Alternatively, input end 216 is coupled to a direct current (DC) power source or to two or three phases of an AC power source.

Current control module 214 includes at least one current protection device 220, at least one current control device 222, and at least one current sensor 224. In one embodiment, power conduit 112 includes a plurality of conductors for receiving a plurality of phases of AC power from electric power source 114 and each conductor includes a separate current protection device 220, current control device 222, and/or current sensor 224.

Current protection device 220, in an exemplary embodiment, is activated to electrically isolate input end 216 from output end 218 if the current flowing through power conduit 112 exceeds a predetermined threshold or current limit. More specifically, current protection device 220 activates, or "trips," when the current flowing through power conduit 112 exceeds a rated current limit of current protection device 220. When current protection device 220 activates or trips, current is prevented from flowing through power conduit 112 (i.e., input end 216 is electrically isolated from output end 218). In an exemplary embodiment, current protection device 220 is a circuit breaker. Alternatively, current protection device 220 may be a fuse, a relay, and/or any other device that enables current protection device 220 to function as described herein.

Current control device 222, in an exemplary embodiment, is a contactor coupled to current protection device 220 by power conduit 112. Moreover, contactor 222 is coupled to, and is controlled by, controller 200. In an exemplary embodiment, controller 200 operates contactor 222 (e.g., opens contactor 222) to interrupt the current flowing through power conduit 112 if a ground fault is detected and/or if a ground fault detection system (not shown in FIG. 2) is determined to be operating incorrectly, as more fully described herein, such that input end 216 is electrically isolated from output end 218. As such, by operating or activating contactor 222, controller 200 prevents current from flowing to power storage device 106. In addition, controller 200 operates contactor 222 (e.g., closes contactor 222) to enable current to flow to power storage device 106, for example, if the ground fault detection system is determined to operate correctly.

At least one current sensor 224 measures and/or detects the current transmitted through power conduit 112 during operation of charging device 104. In an exemplary embodiment, current sensor 224 is a current transformer that measures an amount of current transmitted through power conduit 112 for use in detecting one or more ground faults. Current sensor 224 transmits one or more signals representative of the measured and/or detected current (hereinafter referred to as "current measurement signals") to controller 200.

In the exemplary embodiment, converter 226 may be any power converter capable of converting an AC input into a DC output for use in charging a power storage device 106

Conventional charging devices 104 used with system 100 (shown in FIG. 1) are rated Level 1 to Level 3 based on how the chargers are configured for connection to electric power source 114. For example, Level 1 chargers are configured for use with a conventional household type of circuit, rated at 120 Volts AC to 16 Amps. Level 1 chargers use the standard household 3-prong connection and are typically considered to be a portable type of charger. Conventional Level 1 chargers can recharge an electric vehicle in approximately 8 to 14 hours. Level 2 chargers are configured as permanently wired chargers, used specially for electric vehicle charging and rated at 208 to 240 Volts AC to 80 amps, with a maximum power draw of approximately 19 kilowatts. Conventional Level 2 chargers are capable of recharging an electric vehicle in approximately 4 to 6 hours. Level 3 chargers, like Level 2 chargers, are permanently wired chargers used specially for electric vehicle charging, but are rated for power levels as high as approximately 240 kilowatts, with a current draw as high as approximately 400 amps. Level 3 chargers (e.g., fast chargers) are, according to some embodiments, capable of charging power storage device 106 in approximately 15 minutes or less.

Figure 3:
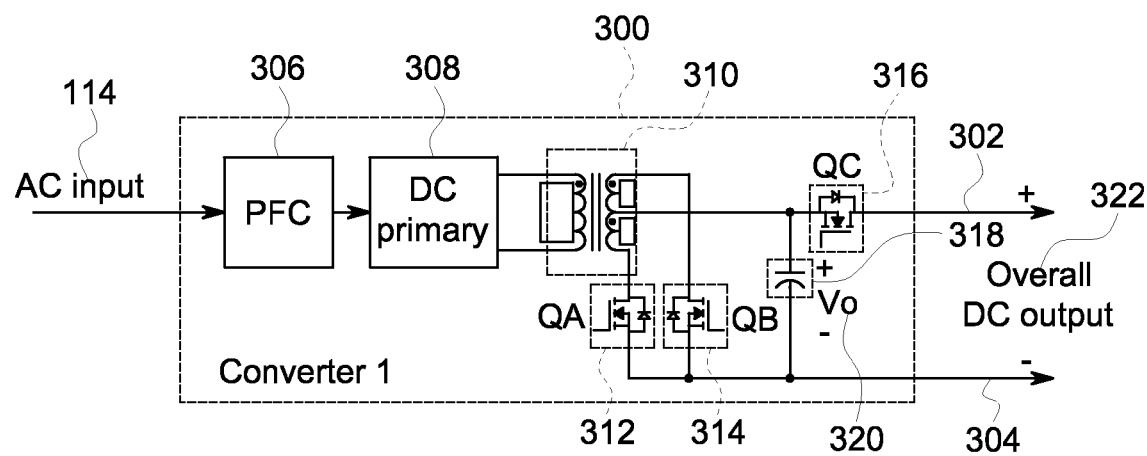
FIG. 3 is a schematic block diagram of an exemplary converter that may be used with the charging device shown in FIG. 2.

FIG. 3 illustrates an exemplary power converter 300 that includes a power factor correction (PFC) circuit 306 for reducing the inductive component of the current being drawn into converter 300. The term "power converter" includes converters and inverters. According to an exemplary embodiment, controller 300 may be controller 226 (shown in FIG. 2). A PFC circuit 306 is configured to reduce harmonics in the supply current. Power converter 300 also includes a DC primary module 308. Output from DC Primary module 308 is fed into a primary winding of a transformer having a center tapped secondary winding. A center tapped transformer, combined with MOSFETS (metal oxide field effect transistors) contained in switching modules 312 and 314 form a full-wave rectifier that allows both half-cycles of the input AC waveform to contribute to the direct current output. Although a center tapped transformer is shown in exemplary converter 300, those skilled in the art will recognize that any suitable AC to DC rectifier configuration can be utilized with the present disclosure. For example, a bridge rectifier could also be employed or a three-level DC-to-DC power train. For three phase AC input, a suitable PFC circuit like a six switch or three-level rectifier circuit would be employed. Output from transformer 310, in this embodiment, is fed through two switching modules 312 and 314 before it is smoothed to a DC output 320 utilizing a capacitor 318.

A third module 316 is employed after DC output 320 of the converter to prevent reverse power flow. This function of the module is also referred to as Oring FET (Field Effect Transistor). Third switching module 316 comprises a diode and a switching component in parallel such that enabling the switching component provides a low resistance path for power to bypass the diode. The switching components may be any suitable transistor rated appropriately for output current and voltage of each converter 300. The switching components could comprise field effect transistors (FET), such as metal oxide semiconductor field effect transistors (MOSFET), bipolar transistors, such as insulated gate bipolar transistors (IGBT), bipolar junction transistors (BJT), and gate turn-off thryistors (GTO).

Figure 4:
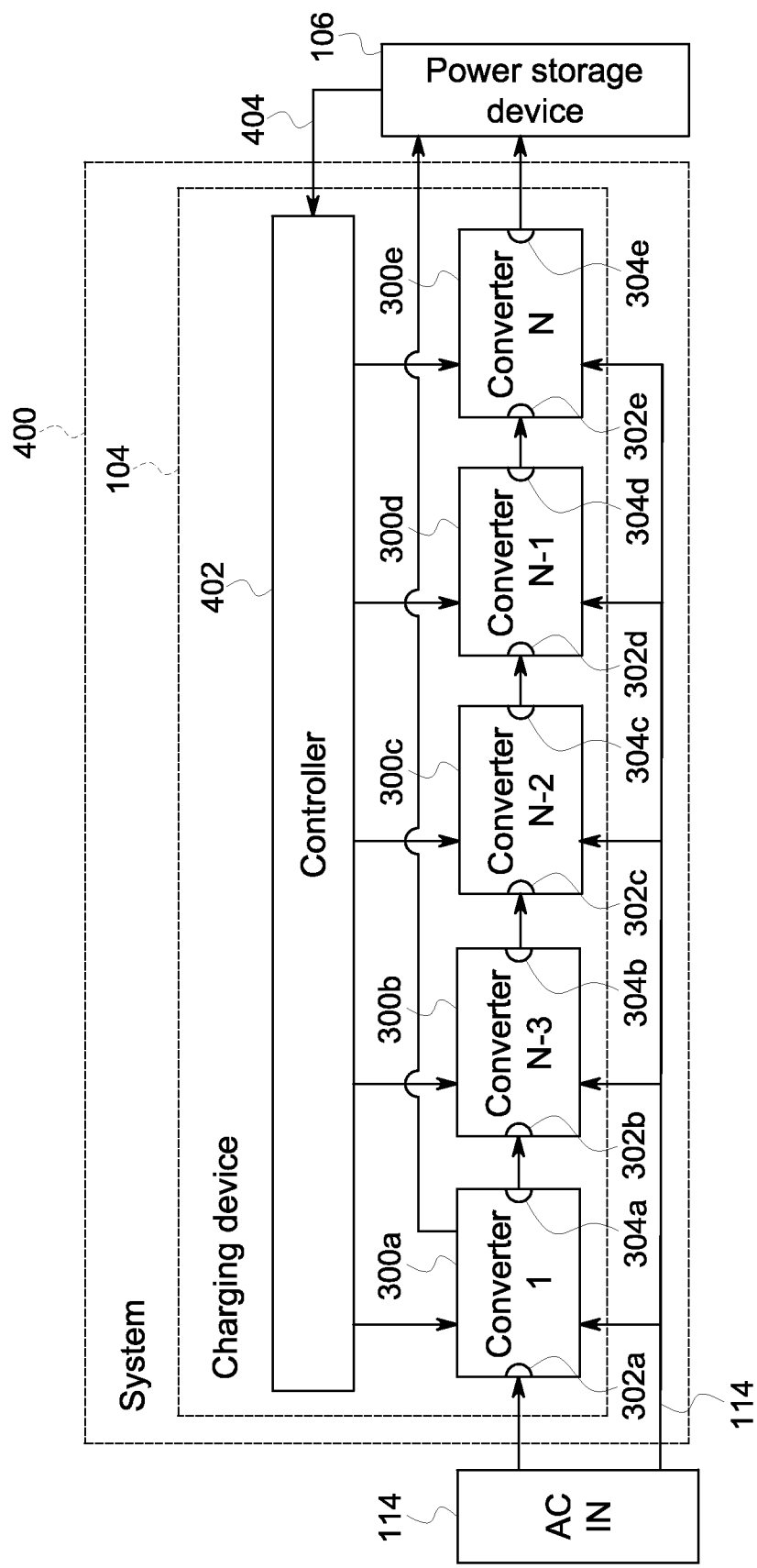
FIG. 4 is a schematic block diagram of an exemplary system for charging a power storage device including a plurality of converters as shown in FIG. 3.

According to an exemplary embodiment shown in FIG. 4, system 400 for charging an energy storage device 106 may utilize any number of converters 300 (e.g., N converters, where "N" represents any number of converters) connected in series at their overall DC output 304. Only those converters 300 of the N converters necessary to achieve a level of charging voltage 322 (as defined by the requirements of individual power storage devices 106) will be enabled. As a result of enabling only those converters 300 of the N converters necessary to achieve the desired level of charging voltage 322, additional power dissipation occurs as series current flows through the non-enabled converters 300 (e.g., through their overall DC output 304). To minimize this additional power dissipation, an enabled switching component (not shown) is placed across overall DC output 304 of each non-enabled converter 300, to provide a substantially low impedance path for current to travel. In an exemplary embodiment, a similar low impedance path is provided by enabling the switching components in switching modules 312, 314 and 316 which provides substantially unrestricted current flow from the positive terminal of the overall DC output 304 to the negative terminal of the overall DC output 304, bypassing the capacitor 318 entirely. The overall DC output 304 of the converter 300 therefore appears as a short circuit to the current flowing through it, minimizing losses.

Figure 5:
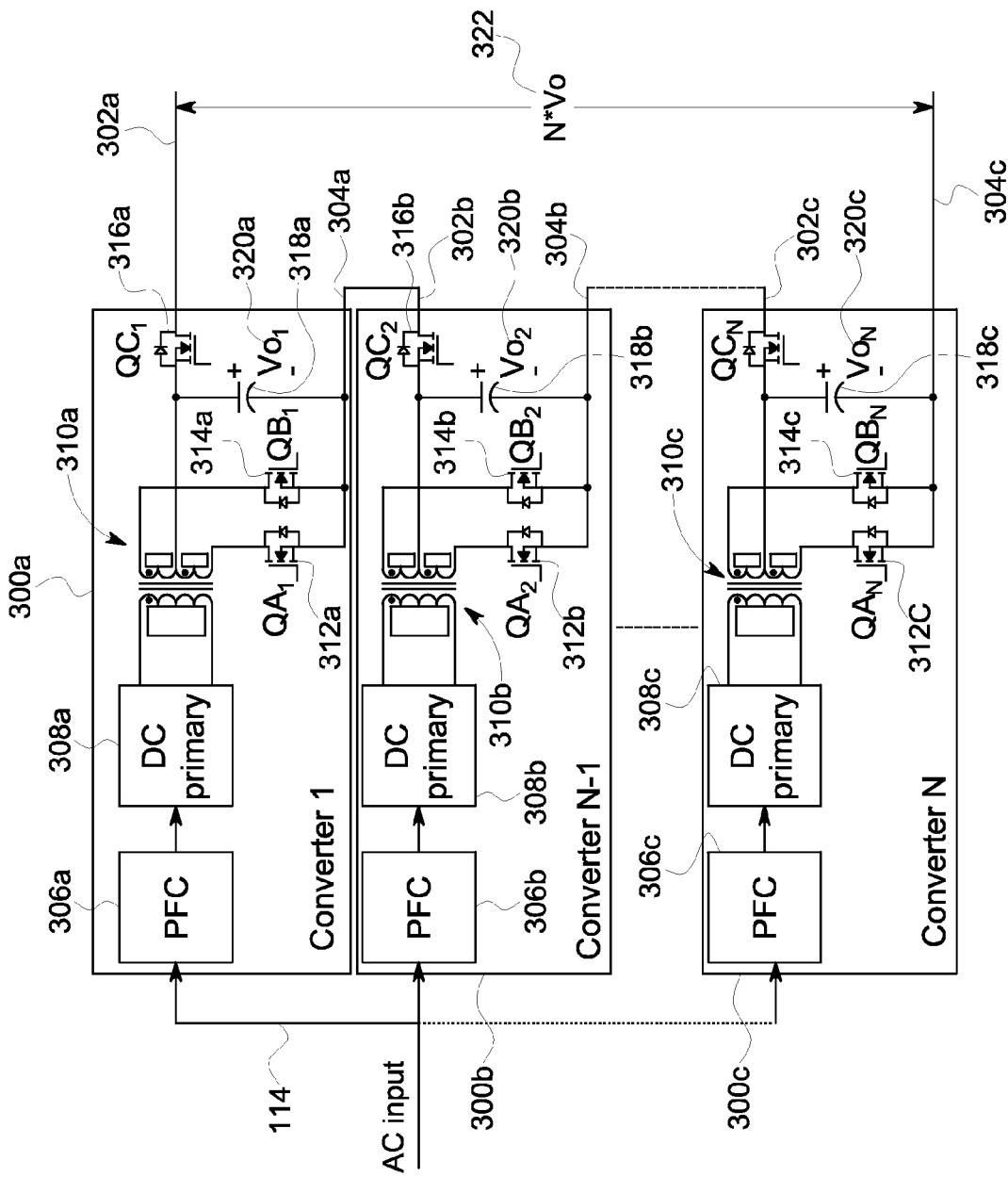
FIG. 5 is a schematic block diagram of a charging system shown in FIG. 4.

FIGS. 4 and 5 illustrate a system 400 for charging an energy storage device. Unless otherwise specified, charging system 400 is substantially similar to charging system 100 (shown in FIG. 1), and similar components are labeled in FIG. 4 with the same reference numerals as used in FIG. 1. System 400 includes a charging device 104 that has a plurality of power converters 300a-e, each having an input terminal 302a-e (e.g., positive output terminal) and an output terminal 304a-e (e.g., negative output terminal). Input terminal 302 is configured to receive power from an AC source and output terminal 304 is configured to output DC current at a predetermined voltage. In an exemplary embodiment, each power converter is configured to receive a range of AC voltages and currents at input terminal 302 and output terminal 304 is configured to output DC current at 50 volts. In this embodiment, each power converter 300 contributes 50 volts to the level of charging voltage 322 when that particular power converter 300 is enabled in system 400. A power storage device voltage signal 404 is received by a controller 402 and configured to determine, based on power storage device voltage signal 400, which power converter 300 (e.g., N power converters) to enable in order for the level of charging voltage 322 to match the desired charging voltage defined by power storage device voltage signal 400. Controller 402 includes processor 202 and memory device 204. In some embodiments, controller 402 is coupled to network interface 206, to display 208, to user interface 210, and to vehicle communication module 212.

In one example, controller 402 receives power storage device voltage signal 404 requiring level of charging voltage 322 of 150 volts to properly charge power storage device 106 attached to system 400. Controller 402 enables three power converters 300 of N power converters. Because each power converter 300 outputs, at its output terminal 304, a voltage of 50 Volts, the effect of combining the outputs of three power converters 300a-c in series results in a level of charging voltage 322 of 150 Volts from system 400. To reduce losses resulting from remaining two power converters 300d and 300e, controller 402 signals switching components in the outputs of these power converters (e.g., the portion of the circuit shown in FIG. 3 from the secondary windings of transformer 310 to overall DC output 304) to create a short circuit path for the current to flow from output terminal 304c of power converter 300c to power storage device 106. The current flows from output terminal 304c of power converter 300c to input terminal 302d of power converter 300d through the short circuit created by the switching components to output terminal 304d and into input terminal 302e of power converter 300e. Similarly, the current flows from input terminal 302e of power converter 300e to output terminal 304e through the short circuit created by the switching components of that particular power converter 300e. From output terminal 304e of power converter 300e, the current flows into power storage device 106 until charging of device 106 is completed or until the AC input to system 400 is removed or otherwise disabled.

According to an exemplary embodiment, a system for use in supplying power to power storage device 106 includes charging device 104. Charging device 104 includes a plurality of power converters 300 wherein each of power converter 300 has output terminal 304 configured to output current at a predetermined voltage (e.g., overall DC output 304). A power conduit is also a component of the charging device, configured to couple output terminals 304 to input terminals 302 in series to deliver current from the plurality of power converters 300 to power storage device 106. System 400 further includes controller 402 programmed to receive power storage device voltage signal 404 from a detection system. Controller 402 determines a level of charging voltage 322 based on power storage device voltage signal 400. Controller 402 enables at least one power converter 300 to supply current at level of charging voltage 322 to power storage device 106. The detection system is configured to be coupled to controller 402 and power storage device 106 to provide power storage device voltage signal 404 to controller 402. Controller 402 may operate more than one of the plurality of power converters 300 to provide power at the level of charging voltage 322. In the exemplary embodiment, power converters 300 are configured in series. Power storage device 106 may be a power storage device 106 of an electric vehicle 102.

In the exemplary embodiment, charging device 104 is coupled to electrical distribution device (e.g., electric power source 114) and is configured to receive current from electric power source 114. Each power converter 300 includes a rectifier circuit and at least one power converter 300 is a LLC resonant converter operating near its resonant frequency. In another embodiment, at least one power converter 300 is a PWM converter operating at a high duty cycle. In alternative embodiments, other suitable power converters 300 are utilized in charging device 104.

Power converters 300, in the exemplary embodiment, employ a switching component (e.g., transistor) coupled across the output terminals (e.g., overall DC output 304) and configured to be enabled on each power converter 300 that is not enabled by controller 402 when system 400 is operating. Power converters 300, in some embodiments, may also have an output with more than one transistor configured to be enabled on each power converter 300 that is not enabled by controller 402 when system 400 is operating.

Figure 6:
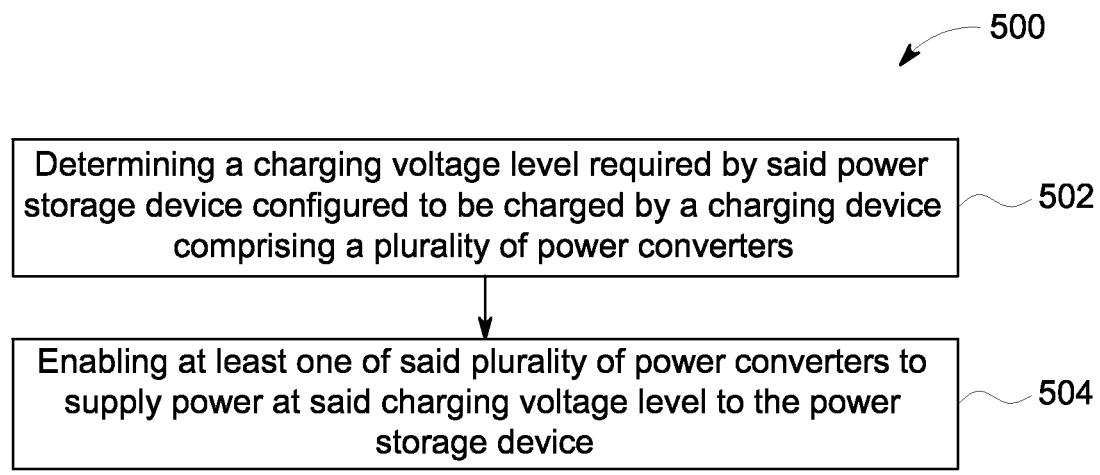
FIG. 6 is a flow diagram of an exemplary method of operating a charging device that may be used with the charging device shown in FIG. 1.

FIG. 6 depicts a method 500 for supplying current at a specific voltage to a power storage device 106. Method 500 includes determining 502 a level of charging voltage 322 required by power storage device 106 configured to be charged by charging device 104 having a plurality of power converters 300. Method 500 also includes enabling 504 at least one power converter 300 to supply power at level of charging voltage 322 to power storage device 106. In one embodiment, power converters 300 are configured in series. Enabling at least one of the plurality of power converters 300 further includes enabling a predetermined number of power converters 300 to supply power at level of charging voltage 322 to power storage device 106. In one embodiment, method 500 also includes determining which power converter 300 to enable to supply power at level of charging voltage 322. Charging device 104 is configured to receive current from electric power source 114 and to supply current at level of charging voltage 322 to power storage device 106. Each power converter 300 has an output terminal 204 configured to output current at a predetermined voltage.

A technical effect of the device and method described herein includes at least one of (a) determining a charging voltage level required by said power storage device configured to be charged by a charging device comprising a plurality of power converters; and (b) enabling at least one of said plurality of power converters to supply power at said charging voltage level to the power storage device.

Exemplary embodiments of a charging device and method of delivering current to a power storage device are described above in detail. The charging device and method are not limited to the specific embodiments described herein, but rather, components of the charging device and/or steps of the method may be utilized independently and separately from other components and/or steps described herein. For example, the charging device may also be used in combination with other power systems and methods, and is not limited to practice with only the electric vehicle as described herein. Rather, an exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in supplying power to a power storage device, said system comprising:
    a charging device comprising:
        a plurality of power converters electrically coupled together in series with each other, each of said plurality of power converters configured to receive an alternating current input and output a direct current at a predetermined voltage, said plurality of power converters comprising an output terminal, said output terminal configured to output a charging current at a charging voltage level; and
        a power conduit configured to be coupled at one end to said output terminal, said power conduit configured to be coupled at a second end to the power storage device; and
    a controller programmed to:
        receive a power storage device voltage signal from the power storage device;
        determine the charging voltage level based on the power storage device voltage signal; and
        enable one or more of said plurality of power converters such that said enabled power converters collectively supply the charging current at the charging voltage level to the power storage device.

2. A system in accordance with claim 1, further comprising a detection system configured to be coupled to said power conduit, said detection system comprising a controller coupled to said power conduit and configured to control the charging voltage level delivered to the power storage device.

3. A system in accordance with claim 1, wherein more than one of said plurality of power converters are configured to operate together to provide power at the charging voltage level.

4. A system in accordance with claim 1, wherein said power conduit couples a negative output terminal of one power converter to a positive output terminal of a next power converter in series.

5. A system in accordance with claim 1, wherein said controller is programmed to enable one or more of said plurality of power converters such that at least one of said plurality of power converters remains disabled, the at least one disabled power converter comprising at least one switching component configured to provide a low impedance path that facilitates reducing power dissipation.

6. A system in accordance with claim 1, wherein said charging device is coupled to an electrical distribution device and is configured to receive current from the electrical distribution device.

7. A system in accordance with claim 1, wherein each of said plurality of power converters comprises a rectifier circuit.

8. A system in accordance with claim 1, wherein at least one of said plurality of power converters is an LLC resonant converter operating near its resonant frequency.

9. A system in accordance with claim 1, wherein at least one of said plurality of power converters is a PWM converter operating at a high duty cycle.

10. A system in accordance with claim 1, wherein at least one of said power converters employs a transistor coupled across a positive output terminal and a negative output terminal.

11. A system in accordance with claim 1, wherein each of said plurality of power converters comprises a transformer having more than one output, at least one of said output having a transistor configured to be enabled on each of said plurality of power converters that is not enabled by said controller.

12. A method of supplying current at a specific voltage to a power storage device, said method comprising:
    detecting, based on a signal from the power storage device, a direct current charging voltage level to be provided to said power storage device; and
    enabling one or more of a plurality of power converters to receive an alternating current input and supply power at the direct current charging voltage level to the power storage device;
    wherein the plurality of power converters is configured in series, and wherein at least one of the plurality of power converters remains disabled and includes at least one switching component configured to provide a low impedance path that facilitates reducing power dissipation.

13. A method in accordance with claim 12, wherein enabling one or more of a plurality of power converters to supply power at the charging voltage level to the power storage device further comprises enabling a predetermined number of power converters of the plurality of power converters to supply power at the charging voltage level to the power storage device.

14. A method in accordance with claim 12, further comprising determining which of the plurality of power converters to enable to supply power at the charging voltage level.

15. A method in accordance with claim 12, wherein the charging device is configured to receive current from an electric power source and to supply current at the charging voltage level to the power storage device.

16. A method in accordance with claim 12, wherein the charging device comprises each of said plurality of power converters having an output terminal configured to output current at a predetermined voltage.

17. A charging device for use in supplying power to a power storage device, said charging device comprising:
- a plurality of power converters, each power converter of said plurality of power converters comprising an input terminal and a negative output terminal, said input terminal configured to receive an alternating current input, and said negative terminal configured to output power at a predetermined direct current voltage;
- a power conduit configured to couple each said power converter in series to deliver power from said plurality of power converters to said power storage device; and
- a controller programmed to:
    - determine, based on signal from the power storage device, a charging voltage level suitable for charging the power storage device; and
    - enable at least one of said plurality of power converters to supply power at the charging voltage level to the power storage device.

18. A charging device in accordance with claim 17, further comprising a detection system configured to be coupled to said power conduit, said detection system comprising a controller coupled to said power conduit and configured to control a charging voltage level delivered to the power storage device.

19. A charging device in accordance with claim 18, wherein more than one of said plurality of power converters are configured to operate together to provide power at the charging voltage level.

20. A charging device in accordance with claim 17, wherein at least one of said plurality of power converters comprises at least one switching component configured to provide a low impedance path through said at least one power converter when said at least one power converter is disabled.

* * * * *